United States Patent
Takeda et al.

(10) Patent No.: US 11,515,926 B2
(45) Date of Patent: Nov. 29, 2022

(54) AUTONOMOUS SELECTION OF A PHYSICAL DOWNLINK CONTROL CHANNEL BEAM

(71) Applicant: QUALCOMM Incorporated, San Diego, CA (US)

(72) Inventors: Kazuki Takeda, Tokyo (JP); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 16/891,946

(22) Filed: Jun. 3, 2020

(65) Prior Publication Data

US 2021/0013955 A1 Jan. 14, 2021

Related U.S. Application Data

(60) Provisional application No. 62/873,558, filed on Jul. 12, 2019.

(51) Int. Cl.
*H04W 72/04* (2009.01)
*H04B 7/08* (2006.01)
*H04W 72/02* (2009.01)

(52) U.S. Cl.
CPC .......... *H04B 7/088* (2013.01); *H04W 72/02* (2013.01); *H04W 72/042* (2013.01)

(58) Field of Classification Search
CPC ... H04W 72/10; H04W 72/02; H04W 72/042; H04W 88/025; H04B 7/0617; H04B 7/088
See application file for complete search history.

(56) References Cited

U.S. PATENT DOCUMENTS

| | | | |
|---|---|---|---|
| 9,572,063 B2* | 2/2017 | Etemad | H04L 45/306 |
| 2013/0170435 A1* | 7/2013 | Dinan | H04L 45/50 |
| | | | 370/328 |
| 2018/0020441 A1* | 1/2018 | Lo | H04W 76/14 |

(Continued)

OTHER PUBLICATIONS

Asustek: "Enhancements on Multiple TRP or Panel Transmssion," 3GPP Draft, 3GPP TSG RAM WG1 #96, R1-1903046, Enhancements on Multiple TRP or Panel Transmission, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 15, 2019 (Feb. 15, 2019), XP051600742, 6 pages, Retrieved from the Internet: URL:http://www.3gpp.org/ftp/tsg%5Fran/WG1%5FRL1/TSGR1%5F96/Docs/R1%2D1903046%2Ezip [retrieved on Feb. 15, 2019] section 2.2, Proposal 3.

(Continued)

*Primary Examiner* — Wei Zhao
(74) *Attorney, Agent, or Firm* — Qualcomm Incorporated (57) ABSTRACT

Various aspects of the present disclosure generally relate to wireless communication. In some aspects, a user equipment (UE) may select, from a plurality of search space sets associated with a plurality of control resource sets, a subset of the plurality of search space sets to monitor. The UE may monitor the subset of the plurality of search space sets, to receive a downlink control information message, for a physical downlink control channel beam associated with the subset of the plurality of search space sets. Numerous other aspects are provided.

28 Claims, 7 Drawing Sheets

(56) References Cited

U.S. PATENT DOCUMENTS

2018/0192405 A1* 7/2018 Gong .................. H04W 88/025
2019/0215712 A1   7/2019 Babaei et al.
2021/0314927 A1* 10/2021 Noh ..................... H04L 5/0053
2022/0038207 A1*  2/2022 Frenne ................. H04L 1/1887

OTHER PUBLICATIONS

International Search Report and Written Opinion—PCT/US2020/036120—ISA/EPO—dated Sep. 11, 2020.
Lenovo., et al., "Discussion of Beam Management and Reporting", 3GPP Draft; 3GPP TSG RAN WG1 #9obis, R1-1717866_Beam_Management, 3rd Generation Partnership Project (3GPP), Mobile Competence Centre, 650, Route Des Lucioles; F-06921 Sophia-Antipolis Cedex, France, vol. RAN WG1, No. Prague, P.R. Czech; Oct. 9, 2017-Oct. 13, 2017, Oct. 8, 2017 (Oct. 8, 2017), 4 Pages, XP051341050, Retrieved from the Internet URL: http://www.3gpp.org/ftp/Meetings_3GPP_SYNC/RAN1/Docs/ [retrieved on Oct. 8, 2017], Section 1, Section 2.1.

* cited by examiner

AUTONOMOUS SELECTION OF A PHYSICAL DOWNLINK CONTROL CHANNEL BEAM

CROSS-REFERENCE TO RELATED APPLICATION

This patent application claims priority to U.S. Provisional Patent Application No. 62/873,558, filed on Jul. 12, 2019, entitled "AUTONOMOUS SELECTION OF A PHYSICAL DOWNLINK CONTROL CHANNEL BEAM," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for autonomous selection of a physical downlink control channel (PDCCH) beam.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method of wireless communication, performed by a user equipment (UE), may include selecting, from a plurality of search space sets associated with a plurality of control resource sets, a subset of the plurality of search space sets to monitor; and monitoring the subset of the plurality of search space sets, to receive a downlink control information message, for a physical downlink control channel beam associated with the subset of the plurality of search space sets.

In some aspects, a UE for wireless communication may include memory and one or more processors coupled to the memory. The memory and the one or more processors may be configured to select, from a plurality of search space sets associated with a plurality of control resource sets, a subset of the plurality of search space sets to monitor; and monitor the subset of the plurality of search space sets, to receive a downlink control information message, for a physical downlink control channel beam associated with the subset of the plurality of search space sets.

In some aspects, a non-transitory computer-readable medium may store one or more instructions for wireless communication. The one or more instructions, when executed by one or more processors of a UE, may cause the one or more processors to select, from a plurality of search space sets associated with a plurality of control resource sets, a subset of the plurality of search space sets to monitor; and monitor the subset of the plurality of search space sets, to receive a downlink control information message, for a physical downlink control channel beam associated with the subset of the plurality of search space sets.

In some aspects, an apparatus for wireless communication may include means for selecting, from a plurality of search space sets associated with a plurality of control resource sets, a subset of the plurality of search space sets to monitor; and means for monitoring the subset of the plurality of search space sets, to receive a downlink control information message, for a physical downlink control channel beam associated with the subset of the plurality of search space sets.

Aspects generally include a method, apparatus, system, computer program product, non-transitory computer-readable medium, user equipment, base station, wireless communication device, and/or processing system as substantially described with reference to and as illustrated by the drawings and/or specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

In some communications systems, a base station (BS) may transmit a radio resource control (RRC) message to configure a quasi-co-location (QCL) parameter (which may be termed a QCL assumption) and an associated transmission configuration indicator (TCI) state for a physical downlink control channel (PDCCH). For example, the BS may transmit the RRC message to a user equipment (UE) to provide configuration information including the QCL parameter and TCI state. The UE may be configured with a single TCI state for a control resource set (CORESET) or a plurality of TCI states for the CORESET. When the UE is configured with a plurality of TCI states, the BS may transmit a medium access control (MAC) control element (CE) to activate a TCI state of the plurality of TCI states.

Using a single beam for receiving a PDCCH may result in a level of reliability for transmitting to the UE that does not satisfy a reliability criterion for a particular service, such as an Industrial Internet of Things (IIoT) reliability threshold, an ultra-reliable low-latency communications (URLLC) reliability threshold, and/or the like. Thus, the BS may use a plurality of beams for transmitting a PDCCH to a UE, and the UE may combine the plurality of beams, which may increase reliability of PDCCH transmissions. In this case, the BS repeats a downlink control information (DCI) message across a plurality of PDCCH candidates in a plurality of search spaces associated with a plurality of CORESETs (e.g., each CORESET having a different TCI state and associated QCL parameter). The UE may combine repetitions of the DCI message across the plurality of PDCCH candidates, thereby achieving diversity gain and a threshold level of reliability. Although some aspects are described herein in terms of "beams," the "beams" may represent QCL assumptions (e.g., values for QCL parameters) associated with search space sets.

However, to perform combining of the repetitions of the DCI, the UE may store bits of the PDCCH before decoding, which may use excessive memory resources and/or require an excessive chip-size to provide sufficient memory. Furthermore, for the UE to monitor a plurality of beams with different QCL parameters and associated TCI states, the BS may need to configure, for the UE, search space sets for a plurality of CORESETs corresponding to the different QCL parameters and associated TCI states, which may require excessive UE complexity.

Some aspects described herein enable autonomous selection of a PDCCH beam. For example, the UE may select a subset of search space sets, where the subset includes one or more search space sets that are each associated with a common QCL parameter and TCI state, thereby achieving a threshold level of reliability with a reduced utilization of memory resources, a reduced UE complexity, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
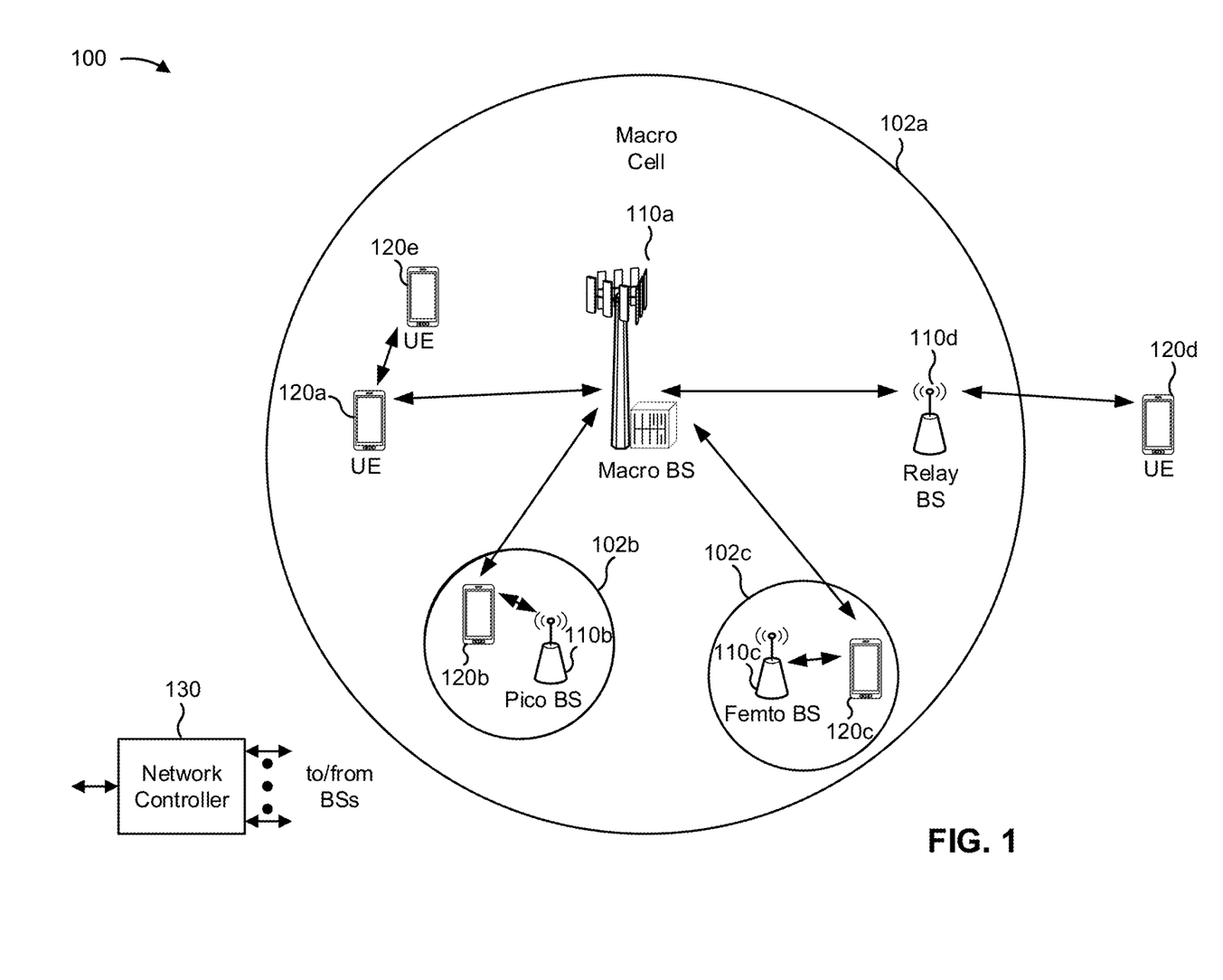
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or Industrial IoT (IIoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like. Some UEs may be capable of autonomous beam switching and autonomous monitored search space set switching to enable receipt of downlink control information from BSs.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
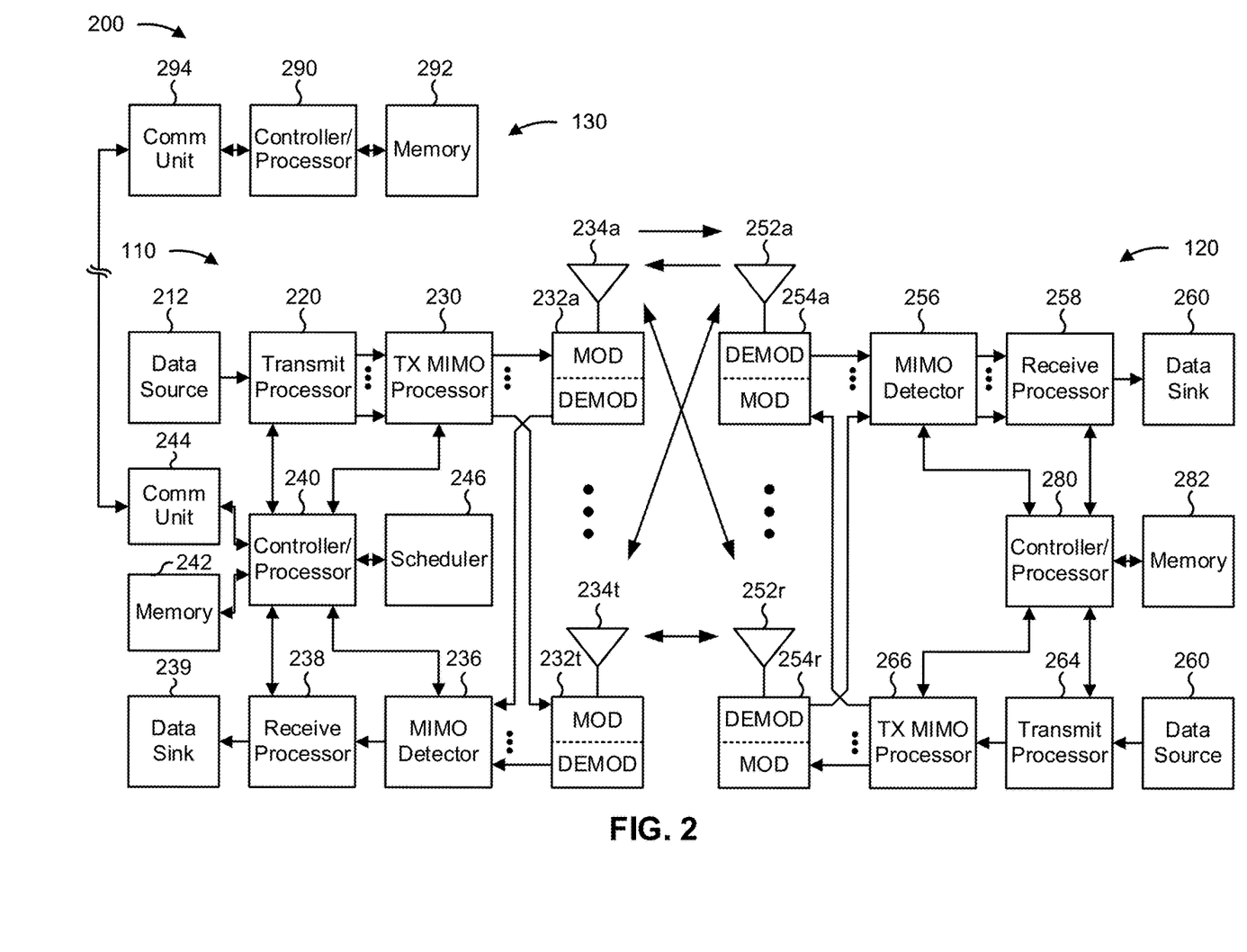
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. For example, UE 120 may use antennas 252 to monitor selected search space sets to receive downlink control information from BS 110. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with autonomous selection of a PDCCH beam, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. A scheduler 246 may schedule UEs for data transmission on the downlink and/or uplink.

Figure 4:
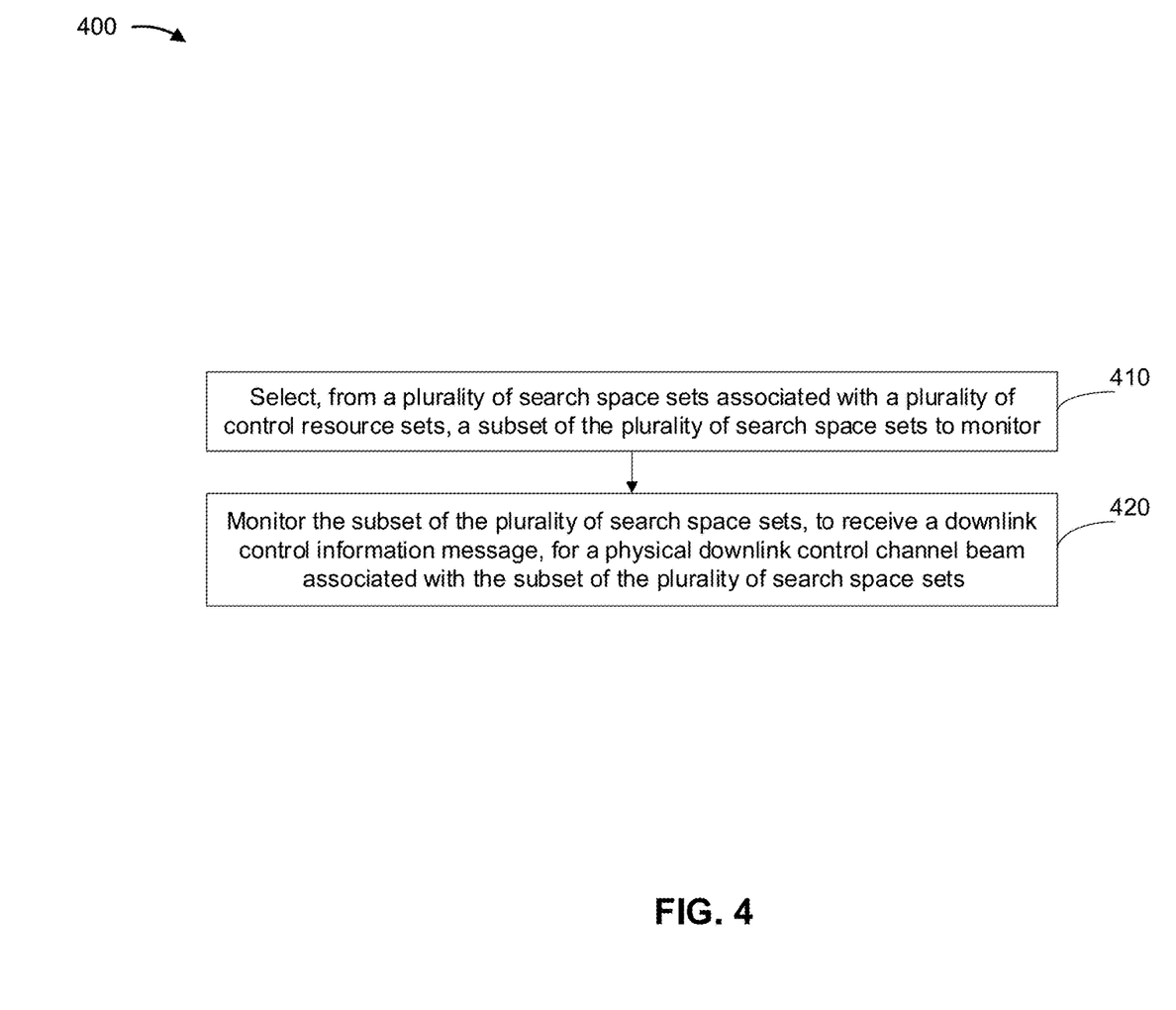
FIG. 4 is a diagram illustrating an example process performed, for example, by a user equipment, in accordance with various aspects of the present disclosure.

The stored program codes, when executed by processor 280 and/or other processors and modules at UE 120, may cause the UE 120 to perform operations described with respect to process 400 of FIG. 4 and/or other processes as described herein. A scheduler 246 may schedule UEs for data transmission on the downlink and/or uplink.

In some aspects, UE 120 may include means for selecting, from a plurality of search space sets associated with a plurality of control resource sets, a subset of the plurality of search space sets to monitor, means for monitoring the subset of the plurality of search space sets, to receive a downlink control information message, for a PDCCH beam associated with the subset of the plurality of search space sets, and/or the like. In some aspects, such means may include one or more components of UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3A:
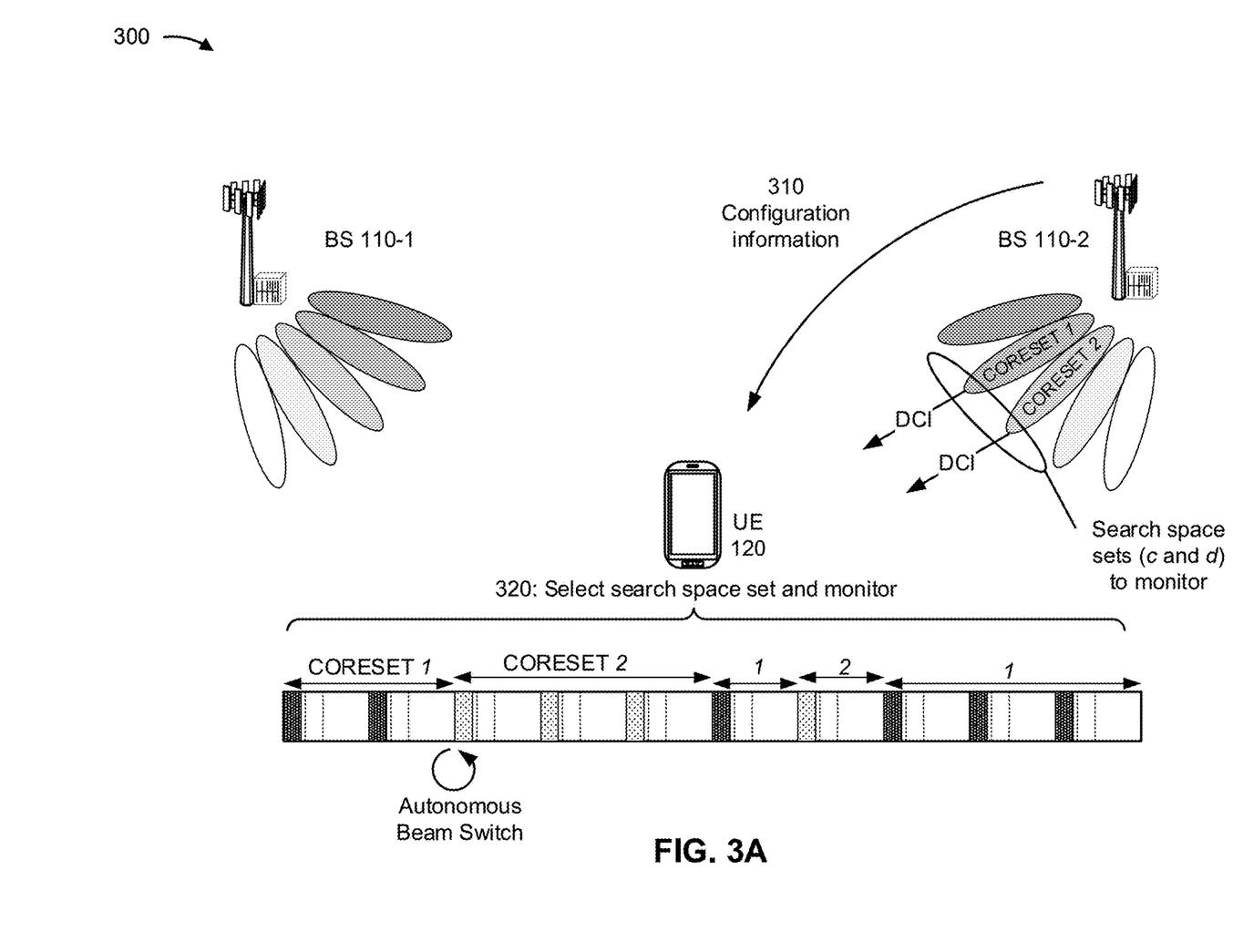
FIGS. 3A-3D are diagrams illustrating an example of autonomous selection of a PDCCH beam, in accordance with various aspects of the present disclosure.

FIGS. 3A-3D are diagrams illustrating an example 300 of autonomous selection of a PDCCH beam, in accordance with various aspects of the present disclosure. As shown in FIG. 3A, example 300 includes a UE 120 and a set of BSs 110 (e.g., shown as BS 110-1 and BS 110-2).

As further shown in FIG. 3A, and by reference number 310, in some aspects, UE 120 may receive configuration information. For example, UE 120 may receive information identifying a plurality of search space sets, a plurality of CORESETs, a plurality of DCI formats, and/or the like. In some aspects, the plurality of CORESETs may be associated with a plurality of different CORESET bandwidths, durations, aggregation levels, and/or the like. Additionally, or alternatively, UE 120 may store the configuration information (e.g., based at least in part on the configuration information being provided during UE deployment, a pre-configured stored configuration information, and/or the like), and may access the stored configuration information for use.

Figure 3B:
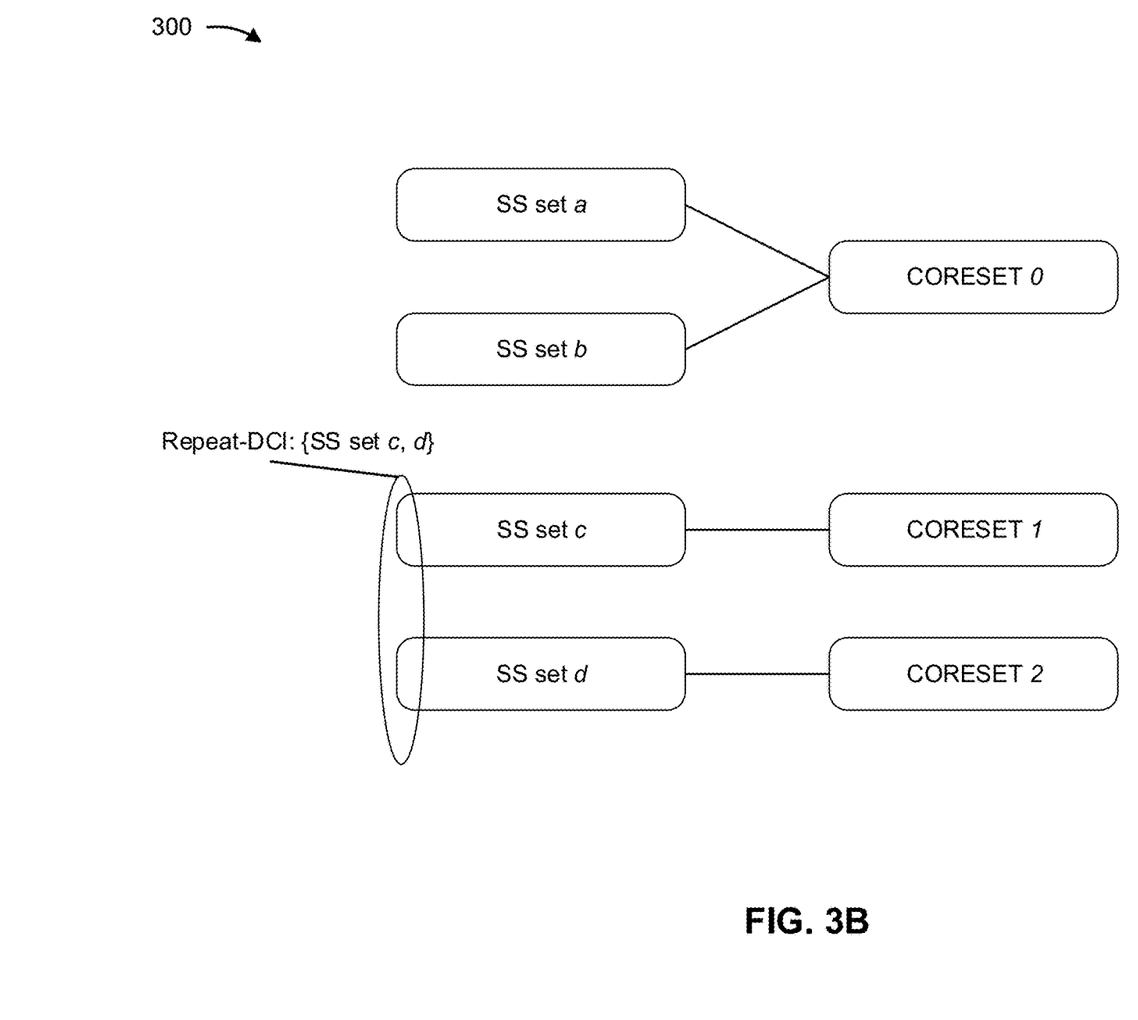
Figure 3C:
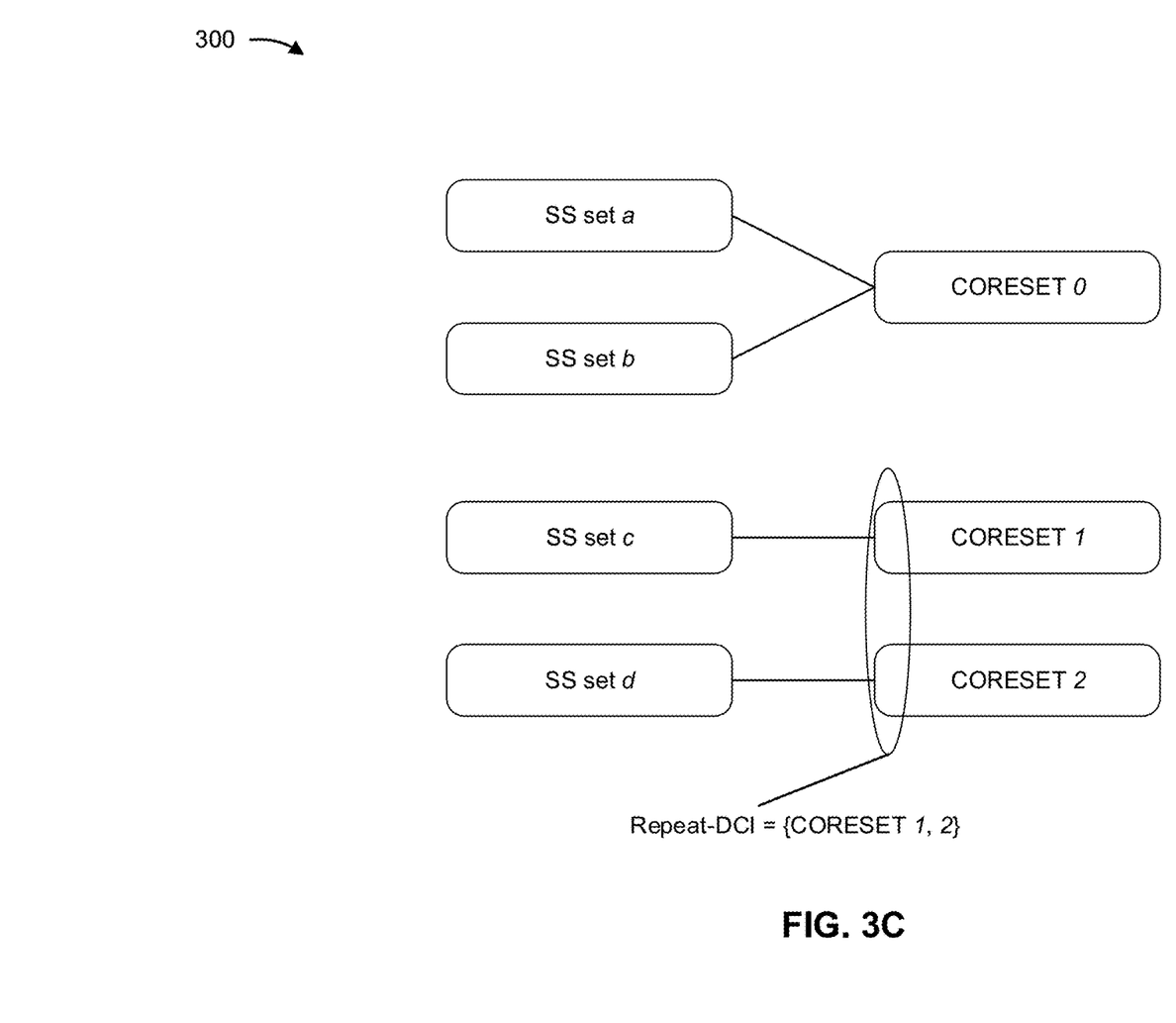

As shown in FIG. 3B, as an example, the configuration information may identify a set of search space sets (SS sets) for which DCI contents are repeated. In this case, the configuration information may indicate that search space set a and search space set b are associated with a common CORESET 0, that search space set c is associated with CORESET 1, that search space set d is associated with CORESET 2, and that DCI contents are repeated across search space sets c and d. Additionally, or alternatively, as shown in FIG. 3C, as another example, the configuration information may identify a set of CORESETs for which DCI contents are repeated. In this case, the configuration information may indicate that search space set a and search space set b are associated with a common CORESET 0, that search space set c is associated with CORESET 1, that search space set d is associated with CORESET 2, and that DCI contents are repeated across CORESETs 1 and 2.

Figure 3D:
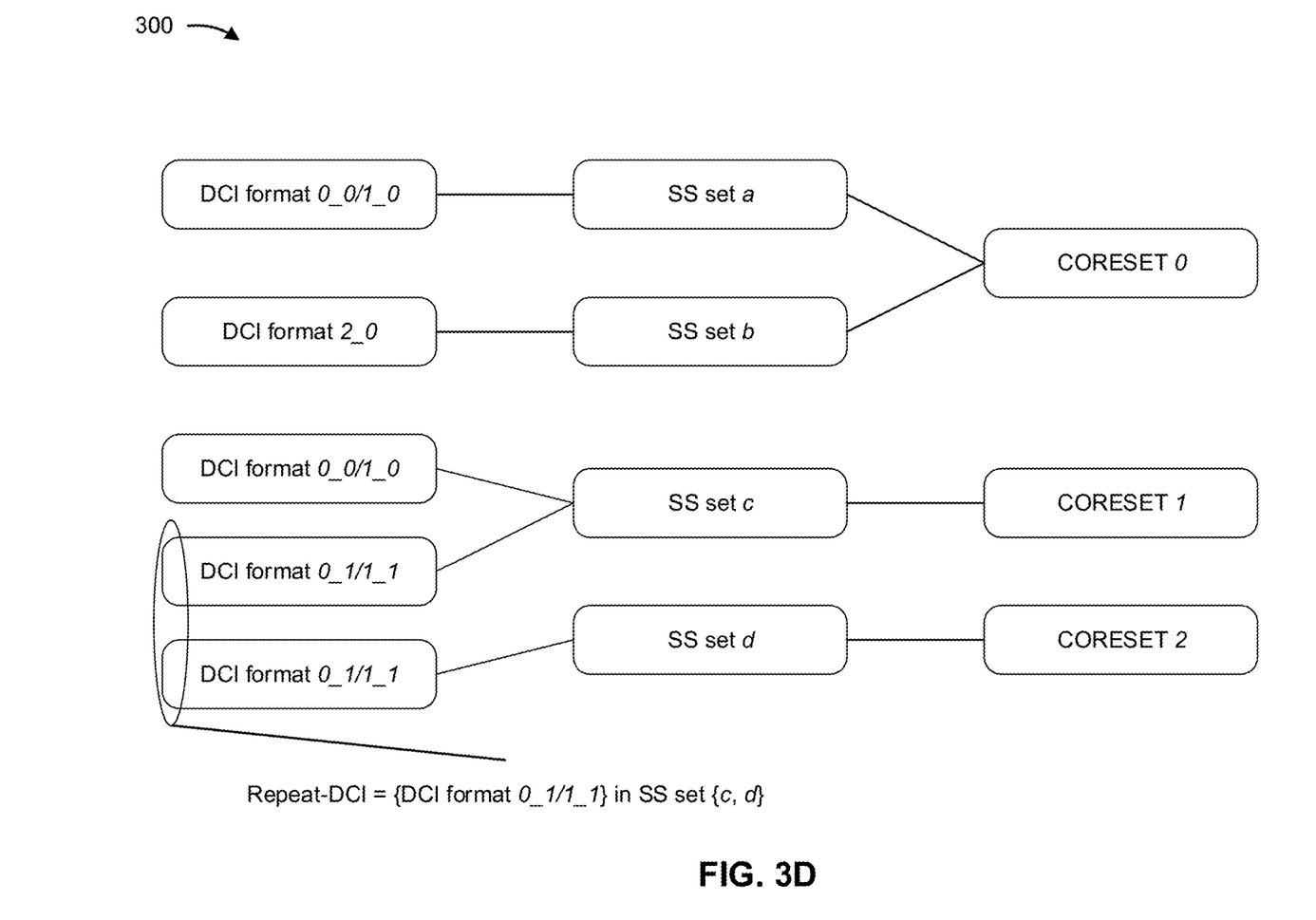

Additionally, or alternatively, as shown in FIG. 3D, as another example, the configuration information may identify a set of DCI formats for which DCI contents are repeated. In this case, the configuration information may indicate that DCI format 0_0/1_0 is associated with search space set a and CORESET 0, DCI format 2_0 is associated with search space set b and CORESET 0, DCI formats 0_0/1_0 and 0_1/1_1 are associated with search space set c and CORESET 1, DCI format 0_0/1_0 is associated with search space set d and CORESET 2, and that DCI contents are repeated across DCI format 0_1/1_1 corresponding to search space sets c and d and to CORESETs 1 and 2.

Returning to FIG. 3A, and as shown by reference number 320, based at least in part on the configuration information, UE 120 may select a search space set and may monitor the selected search space set to receive a DCI associated with a PDCCH beam. For example, UE 120 may select a subset of the plurality of search space sets, where each search space set of the subset is associated with a common QCL parameter, a common TCI state, and/or the like.

In some aspects, UE 120 may determine to switch between a plurality of different search space sets or subsets of search space sets. For example, UE 120 may determine to monitor a first subset of search space sets at a first time and a second subset of search space sets at a second time. In some aspects, the first time and the second time may be different lengths of time. In some aspects, UE 120 may monitor a particular search space set for a plurality of time intervals. For example, UE 120 may monitor for CORESET 1 (and search space set c), switch to monitoring for CORESET 2 (and search space set d), and may subsequently return to monitoring for CORESET 1. In this way, by obviating a need to monitor a plurality of different search space sets (e.g., with different QCL parameters and TCI states) at a single time, UE 120 reduces a utilization of memory resources, processing resources, and/or the like associated with soft-combining a plurality of repetitions of a DCI associated with a plurality of PDCCH beams.

In some aspects, UE 120 may select a preferred one or more beams associated with a preferred one or more search space sets and monitor for the preferred one or more beams. For example, UE 120 may select one or more beams based at least in part on a stored configuration identifying a default selection, based at least in part on one or more beam parameters, and/or the like. In this case, BS 110-1 may transmit the DCI contents across a plurality of beams (e.g., a plurality of search space sets and a plurality of CORESETs) to ensure that UE 120 receives the DCI contents using at least one of the plurality of beams (e.g., the preferred one or more beams associated with the preferred one or more search spaces). For example, rather than transmitting a plurality of repetitions of a DCI via PDCCHs to enable UE 120 to perform combining, BS 110-1 may transmit one or more repetitions of the DCI via one or more PDCCHs to enable the UE to receive one or more PDCCHs without performing combining. In this way, UE 120 enables receipt of a DCI without monitoring every configured search space set concurrently to receive the DCI.

As indicated above, FIGS. 3A-3D are provided as an example. Other examples may differ from what is described with respect to FIGS. 3A-3D.

FIG. 4 is a diagram illustrating an example process 400 performed, for example, by a UE, in accordance with various aspects of the present disclosure. Example process 400 is an example where a UE (e.g., UE 120 and/or the like) performs operations associated with autonomous selection of a PDCCH beam.

As shown in FIG. 4, in some aspects, process 400 may include selecting, from a plurality of search space sets associated with a plurality of control resource sets, a subset of the plurality of search space sets to monitor (block 410). For example, the UE (e.g., using receive processor 258, transmit processor 264, controller/processor 280, memory 282, and/or the like) may select, from a plurality of search space sets associated with a plurality of control resource sets, a subset of the plurality of search space sets to monitor, as described above.

As further shown in FIG. 4, in some aspects, process 400 may include monitoring the subset of the plurality of search space sets, to receive a downlink control information message, for a PDCCH beam associated with the subset of the plurality of search space sets (block 420). For example, the UE (e.g., using receive processor 258, transmit processor 264, controller/processor 280, memory 282, and/or the like) may monitor the subset of the plurality of search space sets, to receive a downlink control information message, for a PDCCH beam associated with the subset of the plurality of search space sets, as described above.

Process 400 may include additional aspects, such as any single aspect or any combination of aspects described below and/or in connection with one or more other processes described elsewhere herein.

In a first aspect, the subset of the plurality of search space sets is defined by a common quasi-co-location parameter or a common transmission configuration indicator state.

In a second aspect, alone or in combination with the first aspect, the plurality of control resource sets are associated with a plurality of different quasi-co-location parameters or a plurality of different transmission configuration indicator states.

In a third aspect, alone or in combination with one or more of the first and second aspects, the downlink control information message is conveyed over each of the plurality of search space sets.

In a fourth aspect, alone or in combination with one or more of the first through third aspects, process 400 includes storing configuration information identifying at least one of the plurality of control resource sets, the plurality of search space sets, or a plurality of downlink control information formats for which the downlink control information message is repeated, and determining the plurality of control resource sets and the plurality of search space sets based at least in part on the stored configuration information.

In a fifth aspect, alone or in combination with one or more of the first through fourth aspects, a content of the downlink control information message is repeated across the plurality of control resource sets and the plurality of search space sets, and at least one of the plurality of control resource sets or the plurality of search space sets has a plurality of configurations.

In a sixth aspect, alone or in combination with one or more of the first through fifth aspects, the plurality of configurations relate to at least one of a control resource set bandwidth, a duration, or an aggregation level.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    selecting, from a plurality of search space sets associated with a plurality of control resource sets, a subset of the plurality of search space sets to monitor for repetitions of a downlink control information message, wherein the subset of the plurality of search space sets is defined by a common quasi-co-location parameter; and
    monitoring the subset of the plurality of search space sets, to receive the downlink control information message, for a physical downlink control channel beam associated with the subset of the plurality of search space sets.

2. The method of claim 1, wherein the subset of the plurality of search space sets is further defined by a common transmission configuration indicator state.

3. The method of claim 1, wherein the plurality of control resource sets are associated with a plurality of different quasi-co-location parameters or a plurality of different transmission configuration indicator states.

4. The method of claim 1, wherein the downlink control information message is conveyed over each of the plurality of search space sets.

5. The method of claim 1, further comprising:
    storing configuration information identifying at least one of the plurality of control resource sets, the plurality of search space sets, or a plurality of downlink control information formats for which the downlink control information message is repeated; and
    determining the plurality of control resource sets and the plurality of search space sets based at least in part on the stored configuration information.

6. The method of claim 1, wherein a content of the downlink control information message is repeated across the plurality of control resource sets and the plurality of search space sets, and
    wherein at least one of the plurality of control resource sets or the plurality of search space sets have a plurality of configurations.

7. The method of claim 6, wherein the plurality of configurations relate to
at least one of:
a control resource set bandwidth,
a duration, or
an aggregation level.

8. A user equipment (UE) for wireless communication, comprising:
a memory; and
one or more processors, coupled to the memory, configured to:
select, from a plurality of search space sets associated with a plurality of control resource sets, a subset of the plurality of search space sets to monitor for repetitions of a downlink control information message, wherein the subset of the plurality of search space sets is defined by a common quasi-co-location parameter; and
monitor the subset of the plurality of search space sets, to receive the downlink control information message, for a physical downlink control channel beam associated with the subset of the plurality of search space sets.

9. The UE of claim 8, wherein the subset of the plurality of search space sets is further defined by a common transmission configuration indicator state.

10. The UE of claim 8, wherein the plurality of control resource sets are associated with a plurality of different quasi-co-location parameters or a plurality of different transmission configuration indicator states.

11. The UE of claim 8, wherein the downlink control information message is conveyed over each of the plurality of search space sets.

12. The UE of claim 8, wherein the one or more processors are further configured to:
store configuration information identifying at least one of the plurality of control resource sets, the plurality of search space sets, or a plurality of downlink control information formats for which the downlink control information message is repeated; and
determine the plurality of control resource sets and the plurality of search space sets based at least in part on the stored configuration information.

13. The UE of claim 8, wherein a content of the downlink control information message is repeated across the plurality of control resource sets and the plurality of search space sets, and
wherein at least one of the plurality of control resource sets or the plurality of search space sets has a plurality of configurations.

14. The UE of claim 13, wherein the plurality of configurations relate to at least one of:
a control resource set bandwidth,
a duration, or
an aggregation level.

15. A non-transitory computer-readable medium storing one or more instructions for wireless communication, the one or more instructions comprising:
one or more instructions that, when executed by one or more processors of a user equipment (UE), cause the one or more processors to:
select, from a plurality of search space sets associated with a plurality of control resource sets, a subset of the plurality of search space sets to monitor for repetitions of a downlink control information message, wherein the subset of the plurality of search space sets is defined by a common quasi-co-location parameter; and
monitor the subset of the plurality of search space sets, to receive the downlink control information message, for a physical downlink control channel beam associated with the subset of the plurality of search space sets.

16. The non-transitory computer-readable medium of claim 15, wherein the subset of the plurality of search space sets is further defined by location parameter or a common transmission configuration indicator state.

17. The non-transitory computer-readable medium of claim 15, wherein the plurality of control resource sets are associated with a plurality of different quasi-co-location parameters or a plurality of different transmission configuration indicator states.

18. The non-transitory computer-readable medium of claim 15, wherein the downlink control information message is conveyed over each of the plurality of search space sets.

19. The non-transitory computer-readable medium of claim 15, wherein the one or more instructions, when executed by the one or more processors, further cause the one or more processors to:
store configuration information identifying at least one of the plurality of control resource sets, the plurality of search space sets, or a plurality of downlink control information formats for which the downlink control information message is repeated; and
determine the plurality of control resource sets and the plurality of search space sets based at least in part on the stored configuration information.

20. The non-transitory computer-readable medium of claim 15, wherein a content of the downlink control information message is repeated across the plurality of control resource sets and the plurality of search space sets, and
wherein at least one of the plurality of control resource sets or the plurality of search space sets has a plurality of configurations.

21. The non-transitory computer-readable medium of claim 20, wherein the plurality of configurations relate to at least one of:
a control resource set bandwidth,
a duration, or
an aggregation level.

22. An apparatus for wireless communication, comprising:
means for selecting, from a plurality of search space sets associated with a plurality of control resource sets, a subset of the plurality of search space sets to monitor for repetitions of a downlink control information message, wherein the subset of the plurality of search space sets is defined by a common quasi-co-location parameter; and
means for monitoring the subset of the plurality of search space sets, to receive the downlink control information message, for a physical downlink control channel beam associated with the subset of the plurality of search space sets.

23. The apparatus of claim 22, wherein the subset of the plurality of search space sets is further defined by a common transmission configuration indicator state.

24. The apparatus of claim 22, wherein the plurality of control resource sets are associated with a plurality of different quasi-co-location parameters or a plurality of different transmission configuration indicator states.

25. The apparatus of claim 22, wherein the downlink control information message is conveyed over each of the plurality of search space sets.

26. The apparatus of claim 22, further comprising:
    means for storing configuration information identifying at least one of the plurality of control resource sets, the plurality of search space sets, or a plurality of downlink control information formats for which the downlink control information message is repeated; and
    means for determining the plurality of control resource sets and the plurality of search space sets based at least in part on the stored configuration information.

27. The apparatus of claim 22, wherein a content of the downlink control information message is repeated across the plurality of control resource sets and the plurality of search space sets, and
    wherein at least one of the plurality of control resource sets or the plurality of search space sets has a plurality of configurations.

28. The apparatus of claim 27, wherein the plurality of configurations relate to at least one of:
    a control resource set bandwidth,
    a duration, or
    an aggregation level.

\* \* \* \* \*